Patented Feb. 4, 1947 2,415,282

UNITED STATES PATENT OFFICE 2,415,282

TOXIC COMPOSITIONS

Frank W. K. Hartshorne, Quincy, Fla., assignor to Floridin Company, Warren, Pa., a corporation of Delaware No Drawing. Application April 22, 1939, Serial No. 269,491

20 Claims. (Cl. 167—15)

1

This invention relates to a product, and the method of making it, which is particularly useful in the control or extermination of mosquitoes, but which is also adapted for use in the destruction of other forms of insect life, or in the treatment of plants affected by insects or fungus diseases.

An object of the invention is the production of materials which are relatively inexpensive, and, at the same time, very toxic to the forms of life which it is desired to exterminate and which may be spread over the infested area with a maximum of efficiency.

One of the particular objects of the invention is to provide a material which may be spread over stagnant water, and which will sink to the bottom where it will exert its lethal effect on larvae, such as those of the *Aedes taeniorhynchus* or other Culicene type of mosquito, which are known as bottom feeders.

In another embodiment of the invention, an objective is the production of a material, a large part of which will float on the surface of water, where it will kill larvae, such as those of the Anophelene mosquito, which feed at the top of the water.

I am aware that previous efforts have been made to combine toxic compounds i. e., parasiticidal agents, such as Paris green, copper sulphate, cyanides, various arsenates, and the like with minerals such as bentonite and various types of fuller's earth. However, these prior efforts have not been notably successful, and I have found that a greatly improved product is produced by combining fuller's earth of the Georgia-Florida type, with parasiticidal agents in the manner hereinafter described. Wherever the term "fuller's earth" is used in this specification, is meant fuller's earth of the Georgia-Florida type, and wherever the term "toxic compounds" is employed, is meant parasiticidal agents.

As will be understood from the examples to follow, the fuller's earth is not heated substantially above 600° F. and, therefore, will contain all or nearly all of its natural water of hydration, and the mixture of fuller's earth and toxic compound will also contain a substantial amount of free or uncombined moisture. By "water of hydration," I mean water which is held in chemical combination and is given off by the clay when subjected to temperatures substantially above 212° F. By "free moisture," I mean moisture which is given off when the earth is subjected to temperatures up to and including 212° F. While some water of hydration is given off when the clay is subjected to any temperature above 212° F., the

2 major portion will remain if the clay is not subjected to temperatures in excess of 600° F. While the natural content of water of hydration will vary in various deposits, it is usually from 7 to 12% based on the weight of clay dried at 212° F.

In the practice of this invention, it is sometimes desirable to dry the fuller's earth after it is mined and before it is mixed with the toxic agent, and it is usually desirable to dry the mixture of fuller's earth and toxic agent before use. It is, therefore, essential that the drying operation or operations be carried out at a low temperature, or, in other words, at a temperature which will not drive off a substantial proportion of the water of hydration. While this temperature may, in some cases, be as high as 600° F., it preferably does not exceed 400° F. and is usually much lower.

The mixture of fuller's earth and toxic agent should contain a sufficient amount of free moisture to render the mixture wet, and by this is meant an amount of water which will give the mixture a plastic or mud-like consistency.

A further critical factor in the production of a highly effective product is a very intimate admixture of the fuller's earth and toxic compound, and this may be obtained by a thorough pugging, or by any other suitable form of admixture.

The mixing of the fuller's earth and toxic compound is preferably followed by extrusion of the mixture. Practicing the extrusion step, the method and apparatus disclosed in my Patent No. 2,079,854, granted May 11, 1937, may be used advantageously. Extrusion pressures, at least, as high or higher than those described in said patent, are employed not only for the purpose of obtaining an improved admixture of the fuller's earth and toxic compound, but also to enhance the adsorbent character of the fuller's earth, as such, since this improvement in the earth adsorbency seems to facilitate the admixture and improve the efficiency of the final product by promoting a uniform toxicity of the product. While the pressures may vary, they should preferably be of a character which will increase the absorbent characteristics of the fuller's earth as described in the aforesaid patent. Moreover, as previously explained, the fuller's earth should contain a major portion of its combined moisture, and in the extrusion step it should have sufficient free moisture to facilitate the extrusion and yet not so much free moisture as to prevent the creation of suitable extrusion pressures. The free moisture range may vary as described in the aforesaid patent.

The advantage of Georgia-Florida fuller's earth to form the toxic composition depends principally, if not entirely, on its hydrogel-forming characteristics. The application of pressure by extrusion or pugging of the clay or earth when in a moist condition reduces it to a mass of more or less finely divided particles depending on the amount of pressure or pugging applied. The finely divided particles of clay form the hydrogel and expand materially in an excess of water. Upon processing the moist clay to which has been added a toxic substance, such as Paris green, there is produced a mass of material or composition in which a gel condition is developed and in which the toxic substance is so intermingled with the gel as to be practically inseparable therefrom.

The nature of the process and product will be better understood by reference to the following illustrative examples.

*Example No. 1*

Three-tenths of a pound of Paris green was added to 5.52 pounds of crude (unheated) fuller's earth (containing approximately 2.09 pounds of free water), and sufficient water was added to thoroughly wet the material, while, at the same time, maintaining a consistency which permitted extrusion. The mixture was pugged and extruded, and the extruded material was dried at approximately 215° F. in steam cabinets. Thereafter, it was ground to 180 mesh, and it was then ready for use.

This material was distributed over an area of 810 square yards of water, in Pinellas County, Florida, which was so heavily infested with bottom feeding mosquito larvae (*Aedes taeniorhynchus*), that the bottom of the area was obscured by them. After one hour and a half, it was found that an 80% kill had resulted, and after approximately five hours, there remained alive in the area only one living larva to each four square yards of surface. These results were obtained in spite of the fact that approximately 50% of the material was carried out of the area by a brisk wind. It is to be further noted that a very even distribution over the area was obtained by reason of the dispersibility of the material in the air and upon contact with the water it sank very readily.

*Example No. 2*

As indicated by various tests, an even more effective larvacide than that described in Example No. 1, is produced by following the same procedure, but with the use of from 10% to 15%, by weight of Paris green, the weights being determined on a dry basis. Different samples containing 10%, 12% and 15%, have been employed, the 12% and 15% samples being more effective than the 10% sample. The 12% sample distributed at the rate of four pounds per acre, gives a very satisfactory kill, and, since the 15% sample was not markedly superior, the 12% sample is preferred, because of its lower cost.

*Example No. 3*

Paris green and fuller's earth were mechanically mixed, without extrusion, using 10% Paris green. The resulting material dusted at the rate of ten pounds per acre over a salt marsh containing the *Aedes taeniorhynchus* gave about 3% mortality.

*Example No. 4*

Paris green and fuller's earth, mechanically mixed with extrusion, using 20% Paris green, and dusted at the rate of ten pounds per acre over another part of the salt marsh referred to in Example No. 3, resulted in approximately 72% mortality.

As indicated by the foregoing examples, the use of the extrusion step in the preparation of the larvacide, is highly desirable, and further evidence of the value of extrusion is found in tests conducted in the following manner.

Two glass measuring columns (each one thousand liter capacity), were filled with water, and into each was run a glass tube which extended to the bottom of the column, the tube being connected to a compressed air line. Into one of these columns four grams of the larvacide described in Example 1 were sifted and, after stirring, the air was turned on so that the water was strongly agitated. The agitation was continued for ten minutes, after which the air was cut off and the larvacide was allowed to settle. On settling, there was no apparent separation visible, with the exception of a very slight tinge of a lighter shade of green on the top of the sediment.

Four grams of a batch of fuller's earth and 10% Paris green were mechanically mixed and the material was stirred in the water, agitated, and settled in the same manner as described above. On settling, there was visible a clear and very definite separation of the Paris green from the fuller's earth.

While the above described larvacides made by extruding a mixture of crude fuller's earth and Paris green are particularly effective against bottom feeding larvae, such as *Aedes taeniorhynchus* and other Culicenes, due to the fact that the major portion of the material sinks readily in water, nevertheless a sufficient proportion of the material remains on the surface, with the result that a good kill of Anophelene larvae is also obtained.

However, more effective results in the extermination of the Anophelene larvae is obtained by using a larvacide of the type described above having admixed therewith a material which will contribute buoyancy or lower the density of the material to such an extent that a large portion, though usually not a major proportion, of the material will float on the surface of the water. The floating type of larvacidal dust is made by extruding a moist or wet mixture containing the proportions of fuller's earth and Paris green, hereinbefore referred to as preferable, having added thereto a suitable amount of a vegetable substance of a starchy or glutinous nature. The extruded material is dried at a temperature, preferably not in excess of 400° F., and then ground to a suitable fineness which may be of 200 mesh. As illustrative of such materials, the following examples will be described.

*Example No. 5*

A small amount of boiled starch was added to a mixture of fuller's earth and Paris green, and the mixture was extruded, dried and ground. A small quantity of the resultant larvacide was tested in a laboratory beaker against both Anophelene and Culicene larvae. A considerable quantity of the material remained on the surface of the water, and although blowing air over the surface of the water and jarring the beaker were resorted to to ascertain whether the material was held on the surface by surface tension only, much of it still remained on the surface. All the larvae in the beaker died in approximately six hours and it was noticeable that the Anophelene larvae were the first to succumb. As a result of many other experiments, it has been found that it is only necessary that a small amount of the larvacide remain on the surface of the infested water in order to effectually destroy Anophelene larvae, and that this type is more readily destroyed than the other types of larvae.

*Example No. 6*

Ten pounds of wet crude fuller's earth (42% free moisture) were mixed with 9.3 ounces of Paris green, and thoroughly mixed by hand. Forty grams of starch were mixed with one liter of water and boiled to a thin paste. 27.4 ounces of the starch paste was then added to the mixture of fuller's earth and Paris green, and the resulting batch was allowed to stand for thirty minutes, and then extruded. It was then dried at between 300° F. and 350° F., and after cooling was ground and sifted through 180 mesh silk.

A small amount of the material thus produced was blown over the surface of some water in the laboratory, and while much of the material sank to the bottom of the beaker, a quantity more than sufficient for killing any surface feeding life remained on the surface of the water. Even though the beaker was jarred, and the surface of the water was agitated by a current of air, a sufficient amount of the material remained on the surface after twenty-four hours to destroy any surface feeding larvae.

The material was also tested by dusting 1.9 grams with a conventional type of dusting gun over a tank having a surface area of eighteen square feet and containing a large number of Anophelene larvae and a few Culicene larvae. After two hours and fifteen minutes, observation indicated that nearly all of the Anophelene larvae and some of the Culicene larvae had been killed, and the following day it was noted that all of the Anophelene larvae and all but one of the Culicene larvae were dead. Forty-two hours after the material was dusted on the water, the surface of the water was examined to determine whether there were any signs of the floating larvacide. A clean microscope slide was dipped under the surface of the water and examination of the slide under the microscope showed small flakes of fuller's earth, a gelatinous material which was apparently starch, and a number of pieces of Paris green either attached to the gelatinous material and fuller's earth, or embedded therein. Similar microscopic examinations were made after elapsed periods of sixty-six and ninety hours, and no change in the above described observations could be noted, the amount of Paris green remaining on the surface still being sufficient to destroy, or prevent the development of, Anophelene larvae.

*Example No. 7*

More effective results than those described in Example 6, are obtained by combining the fuller's earth, Paris green and starch in the following manner. Thirty grams of corn starch was stirred in a liter of cold water, and the mixture was well cooked in a double boiler until the starch was entirely expanded. After the cooked starch had cooled, 6.4 ounces of Paris green was well mixed with the starch by hand, and this mixture was ground thoroughly in a small attrition mill. The product coming from the attrition mill was in the form of a visccus, creamy paste, which, on cooling, became a stiff gel having a smooth homogeneous appearance. The gel was added to crude fuller's earth in such proportions as to give the final product a 10% Paris green content, and the mixture was then extruded, dried at a temperature not exceeding 300° F. and pulverized to 200 mesh. When the material was tested in water containing both Anophelene and Culicene larvae, by dusting a pinch of the material over the surface of the water contained in a four liter beaker, enough of the material remained on the surface, even after jarring and agitation, to spread out into a very thin film. The Anophelene larvae in the beaker all died in less than three hours, and after six and a half hours all of the larvae, including the Culicene larvae, were dead. After the beaker had been allowed to stand for twenty-four hours, it was again jarred, and the surface of the water agitated by air, and the larvacide continued to float as a film on the surface.

Only a few of the many examples of the material which have been tested and found satisfactory have been described above, and where reference has been made only to laboratory tests in the above examples, it is not to be understood that other tests were not made. As the result of extensive investigation, it has been found that effective results may be secured in the field by the use of mixtures of crude fuller's earth and Paris green, the proportion of the latter varying from approximately 5% to approximately 20%. From the standpoint of effectiveness and economy, however, it appears that a Paris green content of from 10% to 15% is preferable.

It is apparent that other toxic compounds may be substituted for the Paris green, as for example, cupric sulphate, calcium arsenite and many others. However, insofar as it is now known, Paris green is preferable, because of its high toxicity, as compared with its cost, and because of its physical characteristics which render it peculiarly adaptable for use with fuller's earth in the manner described above. By virtue of the fact that Georgia-Florida fuller's earth gels in water, the subjecting of the mixture in a moist plastic condition acts to promote the formation of the gel and causes the formation of a substantially physically inseparable toxic composition.

Microscopic and other examination of the final product indicates that the material is not a mere mixture of individual particles of fuller's earth and individual particles of Paris green, but that substantially all of the particles in the final product comprise both fuller's earth and Paris green.

All of the tests which have been carried out indicate that a product made by extruding a mixture of fuller's earth containing all or nearly all of its natural water of hydration and Paris green produces a larvacide very much superior to pure Paris green. Not only is it characterized by an extremely high toxicity, but it can be quickly and cheaply pulverized to a uniformly fine mesh, and can be very efficiently distributed by the use of dust guns.

I claim:

1. A toxic powder consisting of finely divided particles, substantially all of the individual particles comprising fuller's earth of the Georgia-Florida type and a parasiticidal agent, the fuller's earth containing substantially all of its water of hydration.

2. A toxic composition comprising an intimate mixture of fuller's earth of the Georgia-Florida type and from 10% to 15% parasiticidal agent, the fuller's earth containing at least a substantial portion of its water of hydration.

3. A toxic composition comprising an intimate mixture of fuller's earth of the Georgia-Florida type and from 10% to 15% Paris green, the fuller's earth containing at least a substantial portion of its water of hydration.

4. A toxic composition comprising an intimate mixture of fuller's earth of the Georgia-Florida type and from 5% to 20% of cupric sulphate, the fuller's earth containing at least a substantial portion of its water of hydration.

5. A toxic composition comprising an intimate mixture of fuller's earth of the Georgia-Florida type and from 5% to 20% of calcium arsenite, the fuller's earth containing at least a substantial portion of its water of hydration.

6. A toxic composition comprising an extruded mixture of moist fuller's earth of the Georgia-Florida type and a parasiticidal agent, the fuller's earth containing a substantial amount of its water of hydration.

7. A toxic composition comprising an extruded mixture of fuller's earth of the Georgia-Florida type and from 10% to 15% parasiticidal agent, the fuller's earth containing at least a substantial portion of its water of hydration.

8. A toxic composition comprising an intimate mixture of fuller's earth of the Georgia-Florida type, a small amount of starch and a parasiticidal agent, the fuller's earth containing a substantial amount of its water of hydration and the starch contributing buoyancy to the composition.

9. A toxic composition comprising an intimate mixture of fuller's earth of the Georgia-Florida type, a small amount of starch and a parasiticidal agent, the fuller's earth containing at least a major portion of its water of hydration and the starch contributing buoyancy to the composition.

10. The method of making a toxic composition comprising intimately mixing fuller's earth of the Georgia-Florida type containing substantially all of its water of hydration with a parasiticidal agent, drying the mixture at a temperature not exceeding 600° F. whereby a substantial amount of the water of hydration will be retained in the earth and grinding the resulting product to a powder.

11. The method of making a toxic composition comprising intimately mixing fuller's earth of the Georgia-Florida type containing substantially all of its water of hydration with a parasiticidal agent in the presence of a sufficient amount of free water to render the material plastic, extruding the mixture under pressure, drying the extruded material at a temperature not exceeding 600° F. whereby a substantial amount of the water of hydration will be retained in the earth and grinding the resulting product to a powder.

12. The method of making a toxic composition comprising intimately mixing crude moist fuller's earth of the Florida-Georgia type with a parasiticidal agent, drying the mixture at a temperature insufficient to remove a major portion of the water of hydration in the fuller's earth and grinding the dried material to a powder.

13. The method of making a toxic composition comprising intimately mixing fuller's earth of the Georgia-Florida type, with a parasiticidal agent and starch, drying and grinding the material to a powder, the fuller's earth being at no time heated to a temperature exceeding 600° F., whereby a substantial amount of water of hydration will be retained in the fuller's earth.

14. The method of making a toxic composition comprising cooking starch in water until the starch granules are expanded, mixing a parasiticidal agent with the cooked starch and treating the mixture in a colloid mill to form a gel, adding the gel to crude fuller's earth of the Georgia-Florida type, extruding the mixture, drying at a temperature sufficiently low to preserve in the fuller's earth a substantial amount of its water of hydration and pulverizing the dried material.

15. The method of making a toxic composition which comprises intimately mixing fuller's earth of the Georgia-Florida type with a parasiticidal agent, and drying the mixture at a temperature sufficiently low to permit the fuller's earth to retain a substantial amount of its water of hydration.

16. The method of making a toxic composition including intimately mixing fuller's earth of the Georgia-Florida type with a parasiticidal agent, and drying the mixture at a temperature sufficiently low to permit the fuller's earth to retain a sufficient portion of its water of hydration to form a hydrogel, the parasiticidal agent being so intermingled with the gel as to be practically inseparable from the composition.

17. The method of making a toxic composition including intimately mixing fuller's earth of the Georgia-Florida type with a parasiticidal agent, the fuller's earth retaining a sufficient portion of its water of hydration to form a hydrogel, the parasiticidal agent being so intermingled with the gel as to be practically inseparable from the composition, extruding the mixture under pressure, and drying the extruded material at such a temperature that a substantial amount of its water of hydration is retained in the fuller's earth.

18. A toxic composition comprising an intimate mixture of fuller's earth of the Georgia-Florida type and a parasiticidal agent, the fuller's earth containing a substantial amount of its water of hydration.

19. A toxic composition comprising an intimate mixture of fuller's earth of the Georgia-Florida type and a water-insoluble parasiticidal agent, the fuller's earth containing a substantial amount of its water of hydration.

20. The method of preparing a toxic composition which comprises mixing intimately fuller's earth of the Georgia-Florida type and a parasiticidal agent while the earth has a substantial amount of its water of hydration, and then drying the mixture to powder-like form under temperatures which will retain a substantial amount of the water of hydration of the earth.

FRANK W. K. HARTSHORNE.

REFERENCES CITED

The following references are of record in the file of this patent:

UNITED STATES PATENTS

| Number | Name | Date |
|---|---|---|
| 1,520,197 | Meeks | Dec. 23, 1924 |
| 1,793,922 | Funk | Feb. 24, 1931 |
| 2,014,609 | Barnhill | Sept. 17, 1935 |
| 2,079,854 | Hartshorne | May 11, 1937 |
| 1,733,958 | Gardner | Oct. 29, 1929 |
| 1,870,383 | Sanders | Aug. 9, 1932 |
| 1,986,218 | Remy | Jan. 1, 1935 |